(12) United States Patent
Monahan

(10) Patent No.: US 9,224,148 B2
(45) Date of Patent: Dec. 29, 2015

(54) SYSTEM TO MANAGE AUTOMATED PRIZE VALUE ACCUMULATION AND DISTRIBUTION

(75) Inventor: Jay Monahan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 2126 days.

(21) Appl. No.: 11/214,507

(22) Filed: Aug. 29, 2005

(65) Prior Publication Data
US 2007/0060276 A1 Mar. 15, 2007

(51) Int. Cl.
*G07F 17/32* (2006.01)
*G06Q 30/02* (2012.01)
*G06Q 30/06* (2012.01)

(52) U.S. Cl.
CPC ............... *G06Q 30/02* (2013.01); *G06Q 30/06* (2013.01); *G07F 17/32* (2013.01); *G07F 17/329* (2013.01); *G07F 17/3244* (2013.01); *G07F 17/3255* (2013.01)

(58) Field of Classification Search
USPC ............................... 463/17, 42; 705/10, 14.23
See application file for complete search history.

(56) References Cited

U.S. PATENT DOCUMENTS

| 6,656,050 | B2 * | 12/2003 | Busch et al. | 463/42 |
| 7,058,593 | B1 * | 6/2006 | Merritt | 705/14.14 |
| 2002/0028708 | A1 * | 3/2002 | Busch et al. | 463/42 |
| 2002/0032906 | A1 * | 3/2002 | Grossman | 725/42 |
| 2002/0173355 | A1 * | 11/2002 | Walker et al. | 463/25 |
| 2002/0187825 | A1 * | 12/2002 | Tracy et al. | 463/17 |
| 2003/0216961 | A1 * | 11/2003 | Barry | 705/14 |
| 2004/0167815 | A1 * | 8/2004 | DeLaHunt | 705/14 |
| 2004/0254019 | A1 * | 12/2004 | Riendeau et al. | 463/42 |
| 2006/0265667 | A1 * | 11/2006 | Hughes | 715/810 |

FOREIGN PATENT DOCUMENTS

KR 2004079580 A * 9/2004

OTHER PUBLICATIONS

"1 Million Sold Sweepstakes—FAQ", http://pages.motors.ebay.com/1million/faq.html, (2004),3 pages.
"eBay Developers Program: Power Seller Sweepstakes", http://ebaydeveloper.typepad.com/dev/2005/01/power_seller_sw.html, (Jan. 14, 2005),1 page.

(Continued)

*Primary Examiner* — Tramar Harper
(74) *Attorney, Agent, or Firm* — Schwegman Lundberg & Woessner, P.A.

(57) ABSTRACT

A system to manage prize accumulation and distribution includes an interface to receive publication data from a publishing user. The publication data is to be published by the computer system. The interface further receives a prize contribution value, at the computer system and from the publishing user, in exchange for the presentation of an opportunity to win a cumulative prize. The opportunity to win the cumulative prize is to be presented by the computer system in conjunction with the publication of the publication data. A publication module is to electronically publish the publication data on behalf of the publishing user, and is to electronically present the opportunity to win the cumulative prize in conjunction with the publication of the publication data. A prize processing module is to calculate a value of the cumulative prize, based on a cumulative contribution of prize contribution values received from a plurality of publishing users.

42 Claims, 12 Drawing Sheets

(56) References Cited

OTHER PUBLICATIONS

"eBay Motors "Bid on a Boat, Win a Waverunner" Sweepstakes Official Rules", http://pages.motors.ebay.com/boatsweepstakes/rules/, (2003),3 pages.

"eBay Motors: Pepboys Sweeps: Details", http://pages.motors.ebays.ebay.com/pepboyssweeps/details, (2003),1 page.

"eBay Selling Manager: Get Down to Business Sweepstakes", http://pages.ebay.com/selling_manager/sweepstakes/rules.html, (2004),3 pages.

"eBay: Shipping Center Sweepstakes", http://pages.ebay.com/shipping/sweepstakes.html, (2005),4 pages.

"Half.com Welcome Back Weekend! Sweepstakes", http://ebay.promotionexpert.com/concert/, (2005),1 page.

Steiner, Ina, "eBay Australia runs PayPal sweepstakes for buyers", *Auctionbytes—NewsFlash,* No. 1010, From www.auctionbytes.com-,(May 4, 2005),2 pages.

Steiner, Ina, "eBay Runs Sweepstakes for eBay Store Shoppers and for Australian Users", *Auctionbytes—NewsFlash,* No. 1092, From www.auctionbytes.com,(Aug. 24, 2005),1 page.

Steiner, Ina, "eBay Runs Sweepstakes to Promote Selling Tools", *Auctionbytes—NewsFlash,* No. 600, From www.auctionbytes.com,(Sep. 2, 2003),1 page.

\* cited by examiner

SYSTEM TO MANAGE AUTOMATED PRIZE VALUE ACCUMULATION AND DISTRIBUTION

FIELD

This application relates to a computer-implemented computer-implemented method and computer-based system to automate a prize value accumulation and distribution.

BACKGROUND

The Internet abounds with competitions and prize schemes, whereby Internet users are afforded the opportunity to win a prize for performing a certain action, or in return for a payment. Some websites provide free games (after registration) that offer the opportunity to win prizes. Examples of such websites include iwinweekly.com, and iwon.com.

ePrize LLC offers a Pooled eDrawings$^{SM}$ tool that allows companies to offer a targeted $50,000.00 prize each 90-days without paying for the full prize total. Many companies participate in the pool, but there is only one grand prize winner per quarter. The winning promotion is randomly selected each quarter from among participating companies, and a "Grand Prize" winner is randomly selected from that company's entrants.

It is also now possible to participate in many lotteries (e.g., local, state and national lotteries in Europe, Australia, Latin America and Asia) via the Internet. GTech Corporation, for example, administers a large number of online lotteries, and has developed certain technologies in this regard. Such lotteries are typically run by large organizations (e.g., governments) and are funded by the purchase of tickets by potential winners. The lottery prize can be a fixed percentage of receipts, with the organizers promising that the prize will be, for example, 50% of revenue. It will be accordingly appreciated that the size of the prize in lotteries often is dependent upon the popularity of the lottery, and the number of lottery tickets that can be sold. The ability of small organizations to participate in the running of lotteries has to date been hampered by their inability to attract a sufficient number of participants, to provide the required degree of organizational and financial confidence to potential lottery participants, and also the technical challenges that are posed in managing a lottery of any notable size. Dealing specifically with the technical challenges, the processing of the purchase of lottery tickets, the communication of information regarding the lottery (e.g., the total lottery prize), and also the distribution of lottery winnings all present a number of technical challenges. For example, the manual processing of lottery tickets, either purchased in person or online, presents a number of communication and processing technical challenges.

Further, Internet-based prize systems have to date typically operated as standalone systems. The integration of such prize systems with other systems also presents a number of technical hurdles.

SUMMARY

According to an aspect of the invention, there is provided a computer-implemented method and a system to manage prize accumulation and distribution. An interface receives publication data at a computer system from a publishing user. The publication data is to be published by the computer system. The interface further receives a prize contribution value, at the computer system and from the publishing user, in exchange for the presentation of an opportunity to win a prize. The opportunity to win the cumulative prize is to be presented by the computer system in conjunction with the publication of the publication data. A publication module is to electronically publish the publication data on behalf of the publishing user, and is to electronically present the opportunity to win the cumulative prize in conjunction with the publication of the publication data.

Other features of the present invention will be apparent from the accompanying drawings and from the detailed description that follows.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
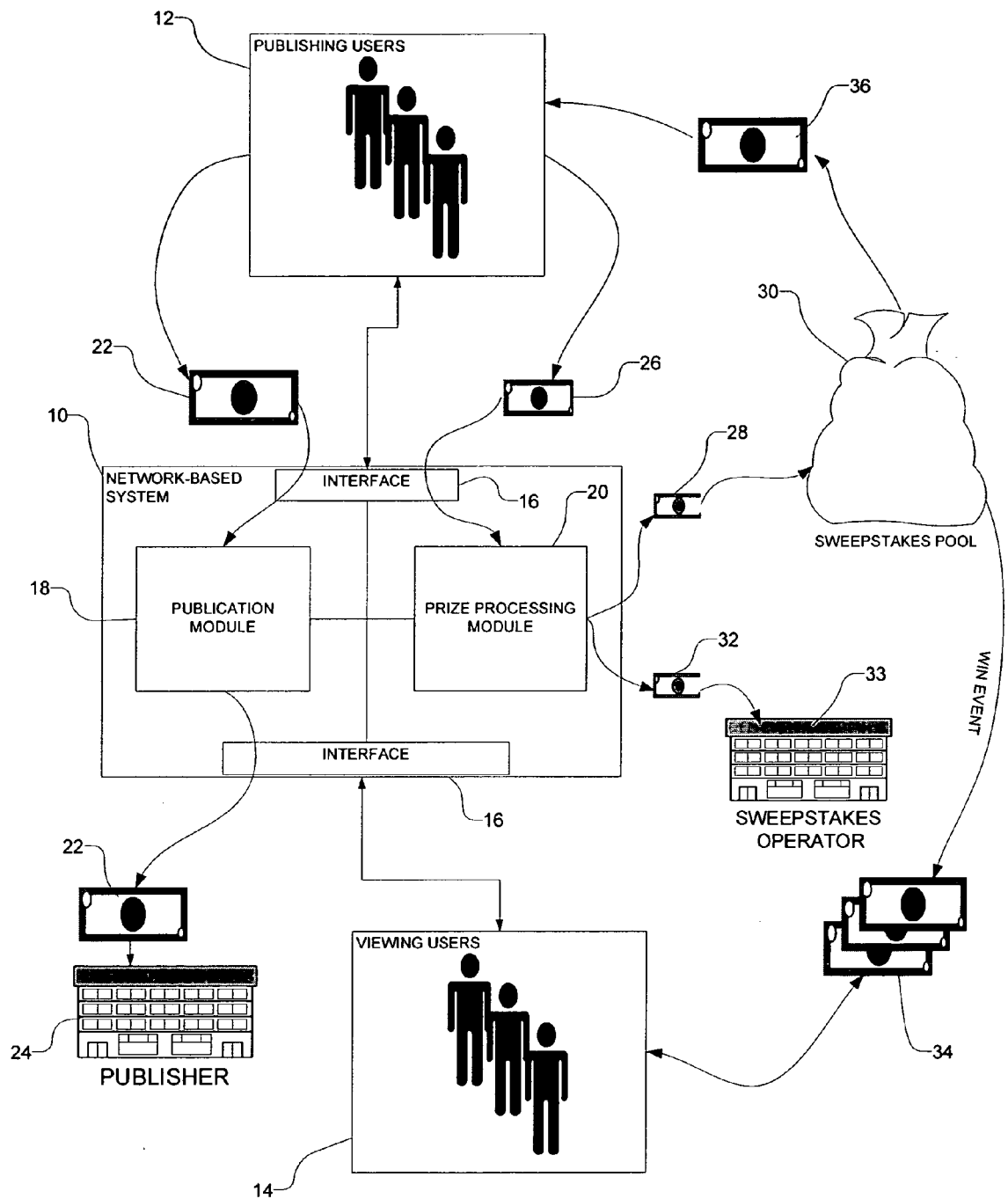
FIG. 1 is a diagrammatic representation of a system to manage automated prize accumulation and distribution, according to an example embodiment of the present invention.

FIG. 1 is a diagrammatic representation of a system and computer-implemented method to manage the publication of data (publication data) in conjunction with automated prize accumulation and distribution, according to an example embodiment of the present invention. In the example embodiment, automated prize accumulation and distribution is performed in association with the publication of the data in order to incentivize potential consumers of the publication data to perform one or more actions with respect to the publication data (e.g., to read the publication data or to transact with respect to goods and/or services described by the publication data). A network-based system 10 includes an interface 16 via which publishing users 12 and viewing users 14 can interact with the network-based system 10. Specifically, the interface 16 may allow the network-based system 10 to receive publication data from the publishing users 12, the publication data to be published via the network-based system 10. To this end, the network-based system 10 includes a publication module 18 which operates to electronically publish the publication data on behalf of the publishing users 12.

The interface 16 also allows the network-based system 10 to receive a publication value, in the example form of a publication fee 22 in consideration (or exchange) for the publication of the publication data by the network-based system 10. The publication fee 22, in one example embodiment, is processed by the network-based system 10 and allocated to a publisher 24, which operates at least the publication module 18 of the network-based system 10. The allocation of the publication fee 22 to the publisher 24 may again be performed via the interface 16 of the network-based system 10. For example, the interface 16 may allow the network-based system 10 to couple to a financial institution at which the publisher 24 holds an account.

The network-based system 10 also includes a prize processing module 20 that is communicatively coupled to the publication module 18. The prize processing module 20 performs various functions to manage and automate the accumulation and distribution of a prize 30. In the various embodiments, the prize may be a cash prize, an asset prize (e.g., motor vehicle), or a "points" prize (e.g., points that are issued by the network-based system 10, and that are redeemable for transactions that are performed via the network-based system 10). In the example embodiment in which a "points" prize is awarded, the awarded points may be funded through the contributions of users of the network-based system 10.

Further, while the prize 30 is described in one example embodiment as being a "cumulative" prize, funded by the contributions of users that have opted-in to a prize scheme, it should be appreciated that the prize 30 could be a value funded from a single source (e.g., an operator of system 10).

The prize processing module 20 may furthermore communicate with the publication module 18, so as to enable the publication module 18 electronically to present opportunities to win the prize 30, in association with the publication of publication data.

The interface 16 of the network-based system 10 is further to receive prize contribution values, in the example form of prize opt-in fees 26, from publishing users. In the example embodiment, a prize contribution fee is received from a publishing user 12, via the interface 16. The prize processing module 20, in exchange for the prize contribution values, causes presentation by the publication module 18 of an opportunity to win the prize 30 in association with the publication of data.

The prize processing module 20 also operates to calculate a value of the prize 30, based on the cumulative contribution of prize opt-in fees 26 received from participating publishing users 12. To this end, the prize processing module 20 may allocate a first portion 28 of the prize opt-in fee 26 to a cumulative value of the prize 30, and may allocate a second portion 32 of the prize opt-in fee 26 to a prize scheme operator, for example in the form a sweepstakes operator 33 where the prize 30 comprises a sweepstakes payout.

The prize processing module 20 also operates to automatically determine when a viewing user 14 has won the prize 30, and is to automatically allocate a first portion 34 of the prize 30 to the winning user 14, and to allocate a second portion 36 of the prize 30 to a publishing user 12. The second portion 36 of the prize 30 is allocated to the publishing user 14 whose publication data was displayed in association with the prize winning opportunity that resulted in a prize winning event.

From the above, it will be appreciated that the prize processing module 20 is responsible for receiving, from each participating publishing user 12, a prize opt-in fee 26. Accordingly, the prize processing module 20 identifies to the publication module 18 which publication data should be published in association with an opportunity to win the prize 30. In one embodiment, a publishing user 12 may also wish to stipulate one or more conditions under which the publication module 18 is to electronically present an opportunity to win the prize 30 to a viewing user 14. Accordingly, the interface 16 allows the network-based system 10 to receive such conditions (e.g., expressed as criteria). For example, when the network-based system 10 operates as a commerce system, the conditions may pertain to a manner in which a viewing user 14 transacts to purchase an item described by relevant publication data. The conditions may, for example, also pertain to a qualification of a viewing user 14. For example, an opportunity to win the prize 30 may only be presented to viewing users 14 that qualify to receive such an opportunity, such qualification being determined by the conditions specified by a publishing user 12.

The conditions may also stipulate that the opportunity to win the prize 30 only be presented during certain hours, or during predetermined time periods (e.g., during traditionally "slow" trading hours, at peak times, or contemporaneously with another event (e.g., the Super Bowl)).

The network-based system 10 also publishes the publication data, on behalf of a publishing user 12, to one or more viewing users 14 via the interface 16. The publication data may be any one of a number of different types of data, such as a listing for goods or services that the publishing user 12 is seeking to transact, an email communication that a publishing user 12 wishes to publish to one or more viewing users 14, or an article or other journalistic publication that a publishing user 12 wishes to present to one or more viewing users 14. The publication module 18 may also publish the publication data in any one of a number of ways. For example, the publication may be a "push" publication (e.g., an email, an instant message (IM), an RSS feed etc.), or a "pull" communication (e.g., an HTML page or downloaded document (e.g., Word document, PDF document)).

While the prize 30 is described herein as being a cash prize, it will of course be appreciated that the prize could also be a non-cash prize (e.g., goods, such as a motor vehicle). In one embodiment, the prize winning process is a sweepstakes lottery. However, in other embodiments, the prize scheme could comprise an "instant win" type scheme, whereby a viewing user 14 can immediately exercise a prize-winning opportunity presented by the network-based system 10 to determine whether or not the prize 30 has been won.

From FIG. 1, it will be appreciated that technical interaction of the publication module 18 and the prize processing module 20, whereby the prize processing module 20 identifies publication data to be associated with a prize-winning opportunity and also identifies conditions for the presentation of that prize-winning opportunity to the publication module 18, presents a technically efficient system, while also allowing the publication module 18 to operate independently to publish data.

Further, the prize processing module 20, through the allocation of the prize 30 to a winning viewing user 14 and to a publishing user 12, incentivizes interactions by both the publishing users 12 and the viewing users 14 with the network-based system 10. For example, publishing users 12 are incentivized to publish data via the network-based system 10, and also to opt-in to the prize-winning opportunities presented by the prize processing module 20, by the prospects of winning the second portion 36 of the prize 30. Similarly, viewing users 14 are incentivized to consume publication data (and optionally to perform other actions with respect to the publication data) by the opportunity to win the prize 30, such an opportunity potentially being presented in association with publication data consumed by the viewing user 14.

It will also be noted that the prize 30 is funded by respective first portions 28 of prize opt-in fees 26 received from multiple publishing users 12. Accordingly, the larger the number of publishing users 12 that participate, the larger the prize. This may prove to be particularly attractive to publishing users, as it allows a publishing user 12 to present an opportunity to win a rather sizeable prize to consumers of the publishing user's data. At the same time, while offering the opportunity to viewing users 14 to win a relatively substantial prize, the cost to an individual publishing user 12 of participating is relatively low, with the burden of funding the prize 30 being shared among a number of publishing users 12.

FIG. 1 also shows the publication module 18 and the prize processing module 20 forming part of one network-based system 10. However, in a further embodiment of the present invention, the prize processing module 20 may be operated by an entity other than the operator of the network-based system 10 and/or the operator of the publication module 18. For example, the prize processing module 20 may form a component of a third party system, in which case the publication module 18 may communicate with the prize processing module 20 via the interface 16. For example, the interface 16 may be an Application Program Interface (API) via which the publication module 18 and the prize processing module 20, as operated by different entities, communicate. Certain functions that are described herein as being performed by the prize processing module 20 may furthermore, in further embodiments, be performed by the publication module 18.

Figure 2:
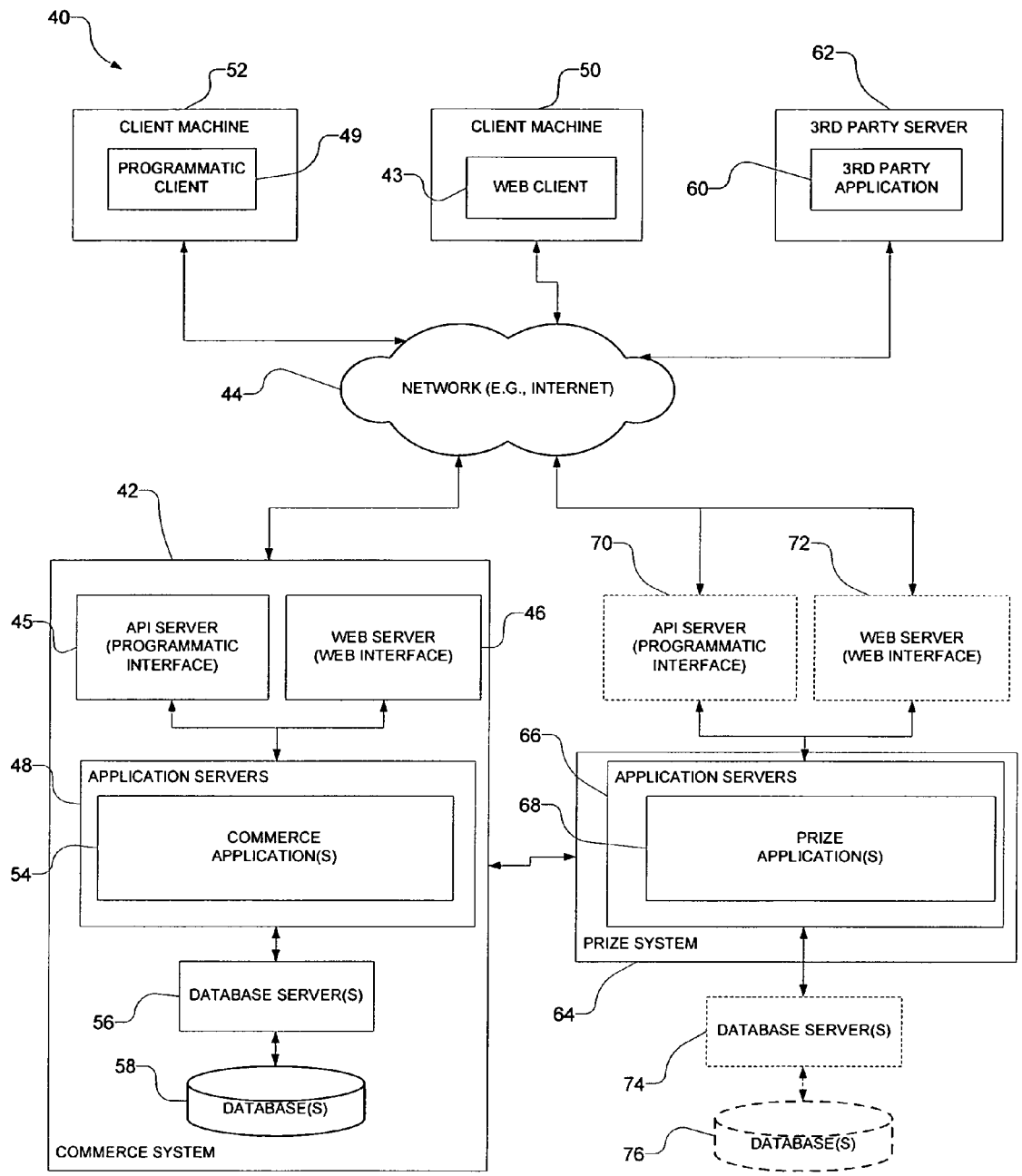
FIG. 2 is a block diagram illustrating an example embodiment including a publication system, in an example form of a commerce system, and a connected prize system.

FIG. 2 is a network diagram depicting a system 40, according to one example embodiment, having a client-server architecture, and in which the publication module 18 is embodied within a commerce system 42, while the prize processing module 20 is embodied in a prize system 64, each of the systems 42 and 64 being independent. Further details regarding this example implementation are provided below. However, it can be noted that the invention is not limited to an embodiment in which the publication of the publication data is performed via a commerce system (e.g., such as a network-based marketplace).

A publication system, in the example form of a commerce system 42, provides server-side functionality, via a network 44 (e.g., the Internet) to one or more clients. FIG. 2 illustrates, for example, a web client 43 (e.g., a browser, such as the Internet Explorer browser developed by Microsoft Corporation of Redmond, Wash.), and a programmatic client 49 executing on respective client machines 50 and 52.

Turning specifically to the commerce system 42, an Application Program Interface (API) server 45 and a web server 46 are coupled to, and provide programmatic and web interfaces respectively to, one or more application servers 48. The application servers 48 host one or more commerce applications 54 (e.g., marketplace and payment applications). The application servers 48 are, in turn, shown to be coupled to one or more database servers 56 that facilitate access to one or more databases 58.

The applications 48 provide a number of commerce-related functions and services to users that access the commerce system 42. For example, payment applications may provide a number of payment services and functions to users. Payment applications may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the commerce system 42. While the applications 54 are shown in FIG. 2 to both form part of the commerce system 42, it will be appreciated that, in alternative embodiments, the payment applications may form part of a payment service that is separate and distinct from the commerce system 42.

Further, while the system 10 shown in FIG. 2 employs a client-server architecture, the present invention is of course not limited to such an architecture, and could equally well find application in a distributed, or peer-to-peer, architecture system. The various applications 54 could also be implemented as standalone software programs, which do not necessarily have networking capabilities.

The web client 43 accesses the applications 54 via the web interface supported by the web server 46. Similarly, the programmatic client 49 accesses the various services and functions provided by the applications 54 via the programmatic interface provided by the API server 45. The programmatic client 49 may, for example, be a seller application (e.g., the TurboLister application developed by eBay Inc., of San Jose, Calif.) to enable sellers to author and manage listings on the commerce system 42 in an off-line manner, and to perform batch-mode communications between the programmatic client 49 and the commerce system 42.

FIG. 2 also illustrates a third party application 60, executing on a third party server machine 62, as having programmatic access to the commerce system 42 via the programmatic interface provided by the API server 45. For example, the third party application 60 may, utilizing information retrieved from the commerce system 42, support one or more features or functions on a website hosted, by the third party. The third party website may, for example, provide one or more commerce-related functions that are supported by the relevant applications of the commerce system 42.

The system 40 further includes the above-mentioned prize system 64, which includes one or more application servers 66 hosting a prize processing module, in the exemplary form of the prize applications 68. Where the prize system 64 operates purely in conjunction with the commerce system 42, it may perform part of the commerce system 42, or may be communicatively coupled to the commerce system 42 through appropriate interfaces. The prize system 64, in one embodiment, may also operate as a standalone prize system 64, which is capable of operating independently of the commerce system 42, as well as operating in conjunction or association with the commerce system 42. In this embodiment, the prize system 64 may have a number of independent interfaces, such as a programmatic interface 70 and a web interface 72 through which it is accessible via the network 44. The application servers 66 may also optionally be supported by one or more database servers 74, which facilitate access to one or more dedicated databases 76. In FIG. 2, the interfaces 70 and 72, the database servers 74 and databases 76 are shown in broken line to differentiate between the embodiments that are reflected in FIG. 2.

Figure 3:
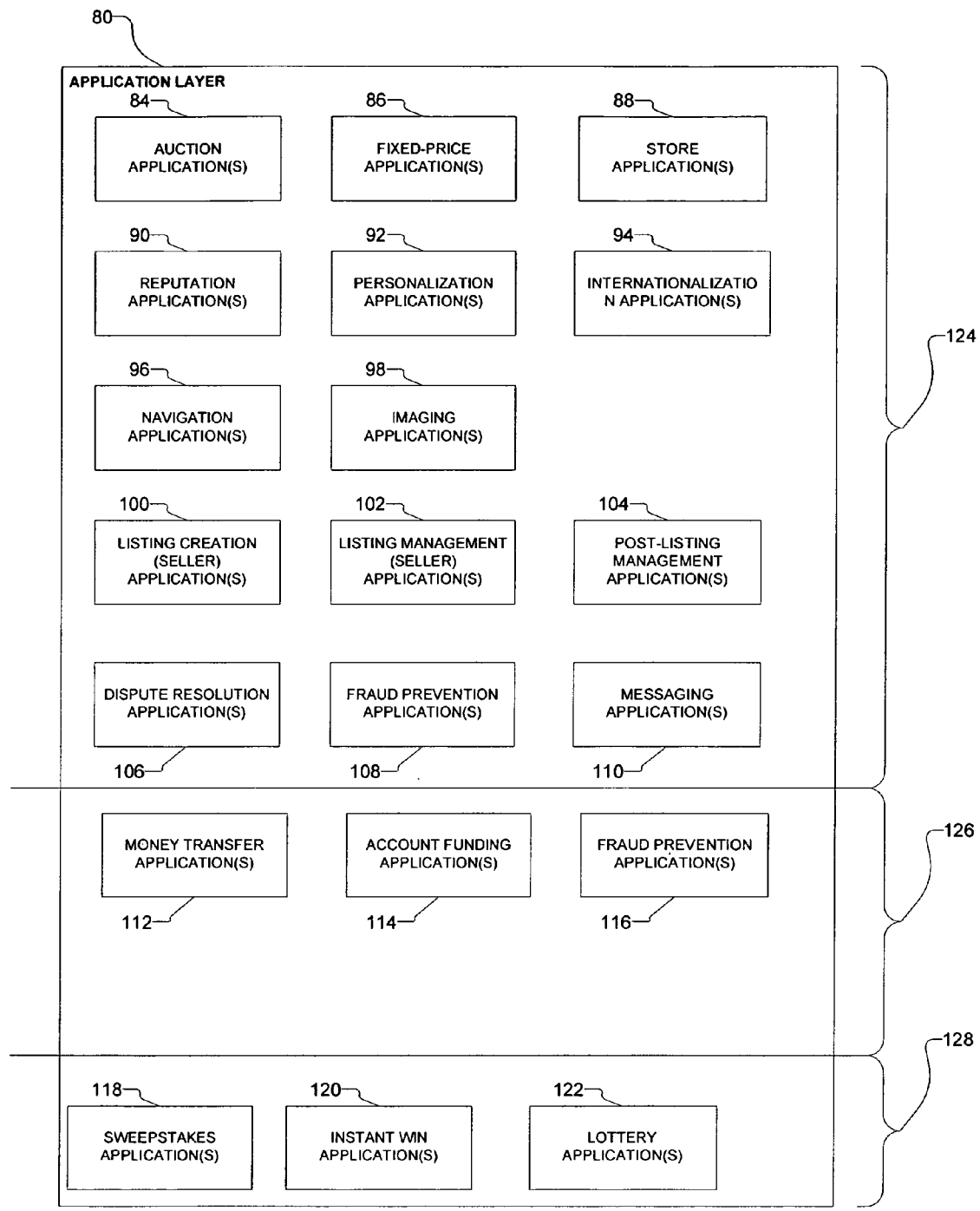
FIG. 3 is a block diagram illustrating the application layer architecture of a system, according to an example embodiment of the present invention.

FIG. 3 is a block diagram illustrating an application layer 80, in one example embodiment, of the commerce system 42 and the prize system 64. The commerce system 42 may provide a number of publication (e.g., listing) and price-setting mechanisms whereby a seller may list goods or services for sale, a buyer can express interest in or indicate a desire to purchase such goods or services, and a price can be set for a transaction pertaining to the goods or services. The application layer 80 is shown in FIG. 3 to be broadly categorized into commerce applications 124, payment applications 126, and prize applications 128.

The commerce applications 124 include one or more auction applications 83 which support auction-format listing and price setting mechanisms (e.g., English, Dutch, Vickrey, Chinese, Double, Reverse auctions etc.). The various auction applications 84 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 86 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.), may be offered in conjunction with an auction-format listing, and allow a buyer to purchase goods or services, which are also being offered for sale via an auction, for a fixed-price that is typically higher than the starting price of the auction.

Store applications 88 allow sellers to group their listings (or other publications) within a "virtual" store, which may be branded and otherwise personalized by and for the sellers. Such a virtual store may also offer promotions, incentives and features that are specific and personalized to a relevant seller.

Reputation applications 90 allow parties that transact utilizing the commerce system 42 to establish, build and maintain reputations, which may be made available and published to potential trading partners. Consider that where, for example, the commerce system 42 supports person-to-person trading, users may have no history or other reference information whereby the trustworthiness and credibility of potential trading partners may be assessed. The reputation applications 90 allow a user, for example through feedback provided by other transaction partners, to establish a reputation within the commerce system 42 over time. Other potential trading partners may then reference such a reputation for the purposes of assessing credibility and trustworthiness.

Personalization applications 92 allow users of the commerce system 42 to personalize various aspects of their interactions with the commerce system 42. For example a user may, utilizing an appropriate personalization application 92, create a personalized reference page at which information regarding transactions to which the user is (or has been) a party may be viewed. Further, a personalization application 92 may enable a user to personalize listings and other aspects of their interactions with the commerce system 42 and other parties.

In one embodiment, the commerce system 42 may support a number of marketplaces that are customized, for example, for specific geographic regions through the use of internationalization applications 94. A version of (or interface to) the commerce system 42 may be customized for the United Kingdom, whereas another version of (or interface to) of the commerce system 42 may be customized for the United States, utilizing the internationalization applications 94. Each of these versions may operate as an independent marketplace, or may be customized (or internationalized) presentations of a common underlying marketplace.

Navigation of the commerce system 42 may be facilitated by one or more navigation applications 96. For example, a search application enables key word searches of listings published via the commerce system 42. A browse application allows users to browse various category, catalogue, or inventory data structures according to which listings may be classified within the commerce system 42. Various other navigation applications may be provided to supplement the search and browsing applications.

In order to make listings (and other data published by the commerce system 42) as visually informing and attractive as possible, the applications 54 may include one or more imaging applications 98 utilizing which users may upload images for inclusion within listings. An imaging application 98 also operates to incorporate images within viewed listings. The imaging applications 98 may also support one or more promotional features, such as image galleries that are presented to potential buyers. For example, sellers may pay an additional fee to have an image included within a gallery of images for promoted items.

Listing creation applications 100 allow sellers conveniently to author listings (or other publication data) pertaining to goods or services that they wish to transact via the commerce system 42, and listing management applications 102 allow sellers to manage such listings. Specifically, where a particular seller has authored and/or published a large number of listings, the management of such listings may present a challenge. The listing management applications 102 provide a number of features (e.g., auto-relisting, inventory level monitors, etc.) to assist the seller in managing such listings. One or more post-listing management applications 104 also assist sellers with activities that typically occur post-listing. For example, upon completion of an auction facilitated by one or more auction applications 84, a seller may wish to leave feedback regarding a particular buyer. To this end, a post-listing management application 104 may provide an interface to one or more reputation applications 90, so as to allow the seller conveniently to provide feedback regarding multiple buyers to the reputation applications 90.

Dispute resolution applications 106 provide mechanisms whereby disputes arising between transacting parties may be resolved. For example, the dispute resolution applications 106 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 108 implement various fraud detection and prevention mechanisms to reduce the occurrence of fraud within the commerce system 42.

Messaging applications 110 are responsible for the generation and delivery of messages to users of the commerce system 42, such messages for example advising users regarding the status of listings at the commerce system 42 (e.g., providing "outbid" notices to bidders during an auction process or to provide promotional and merchandising information to users).

The payment applications 126, which may form part of the commerce system 42 or part of a separate payment system (not shown) include money transfer applications 112 to enable the transfer of value between accounts held by different parties in order to effect payments, account funding applications 114 that enable, in one embodiment, users to fund accounts that are maintained by the payment applications 126 from external sources (e.g., from external accounts), and fraud prevention applications 108 which institute a number of anti-fraud measures.

The prize applications 128, in the exemplary embodiment, may include one or more sweepstakes applications 118, one or more instant win applications 120, and lottery applications 122, each of which may implement different prize win event detection computer-implemented methodologies, for example, and also different prize accumulation and distribution computer-implemented methodologies and schemes.

Figure 4:
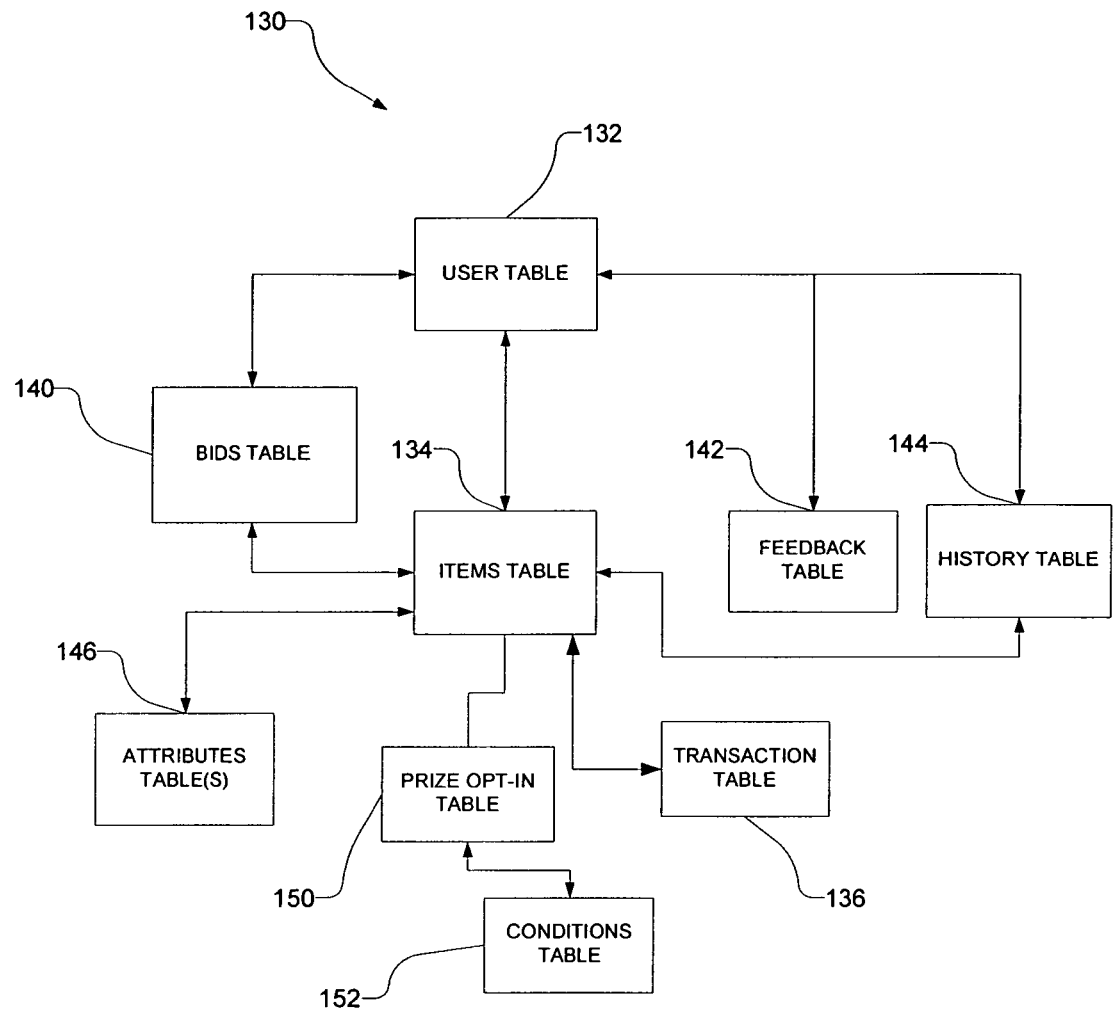
FIG. 4 is an entity-relationship diagram illustrating tables that may be maintained by a system, according to an example embodiment of the present invention.

FIG. 4 is a high-level entity-relationship diagram, illustrating the various tables 130 that may be maintained within the databases 58 and/or 76, and that are utilized by and support the applications described above. A user table 132 contains a record for each registered user of the commerce system 42, and may include identifier, address and financial instrument information pertaining to each such registered user. A user may, it will be appreciated, operate as a seller, a buyer, or both, within the commerce system 42. In one example embodiment, a buyer may be a user that has accumulated value (e.g., commercial or proprietary currency), and is then able to exchange the accumulated value for items that are offered for sale by the commerce system 42.

The tables 130 also include an items table 134 in which are maintained publication data in the example form of item records for goods and services that are available to be, or have been, transacted via the commerce system 42. Each item record within the items table 134 may furthermore be linked to one or more user records within the user table 132, so as to associate a seller and one or more actual or potential buyers with each item record.

A transaction table 136 contains a record for each transaction (e.g., a purchase transaction) pertaining to items for which records exist within the items table 134.

Bid records within a bids table 140 each relate to a bid received at the commerce system 42 in connection with an auction-format listing supported by an auction application 84. A feedback table 142 is utilized by one or more reputation applications 90, in one example embodiment, to construct and maintain reputation information concerning users. A history table 144 maintains a history of transactions to which a user has been a party. One or more attributes tables 146 record attribute information pertaining to items for which records exist within the items table 134, and such attribute information may, in one example embodiment, also be considered to be publication data. Considering only a single example of such an attribute, the attributes tables 146 four may indicate a currency attribute associated with a particular item, the currency attribute identifying the currency of a price for the relevant item as specified in by a seller.

A prize opt-in table 150, which is keyed to the items table 134, records for which item records, a publishing user 12 has elected to opt-in to a prize scheme supported by the prize system 64. To this end, the prize opt-in table 150 may include a flag (or other indication) for each record in the items table 134, indicating whether or not a prize opt-in option has been exercised by a respective publishing user 12 for the item record. The data within the prize opt-in table 150 may be written to this table by an embodiment of a publication module 18, responsive to receiving a communication from a prize processing module 20 that a prize opt-in fee 26 has been received from the relevant publishing user 12.

Associated with the prize opt-in table 150 is a conditions table 152, which records conditions with each item record opted-in to the prize scheme. As noted above, such conditions are referenced, in one embodiment, by the publication module 18 in determining whether to present an opportunity to win the prize 30 to a viewing user 14. Again, the data within the conditions table 152 may be written into this table by an embodiment of a publication module 18, based on condition information passed to the publication module 18 by a prize processing module 20. The prize processing module 20, in turn, will have received this condition information from a relevant publishing user 12.

Data within the prize opt-in table 150 and the conditions table 152 is referenced, in one embodiment, by a publication module 18 in determining whether to present an opportunity, to a viewing user 14, to win the prize 30, this opportunity being presented by the publication module 18 in association with the publication of publication data (e.g., data from the items table 134).

Figure 5:
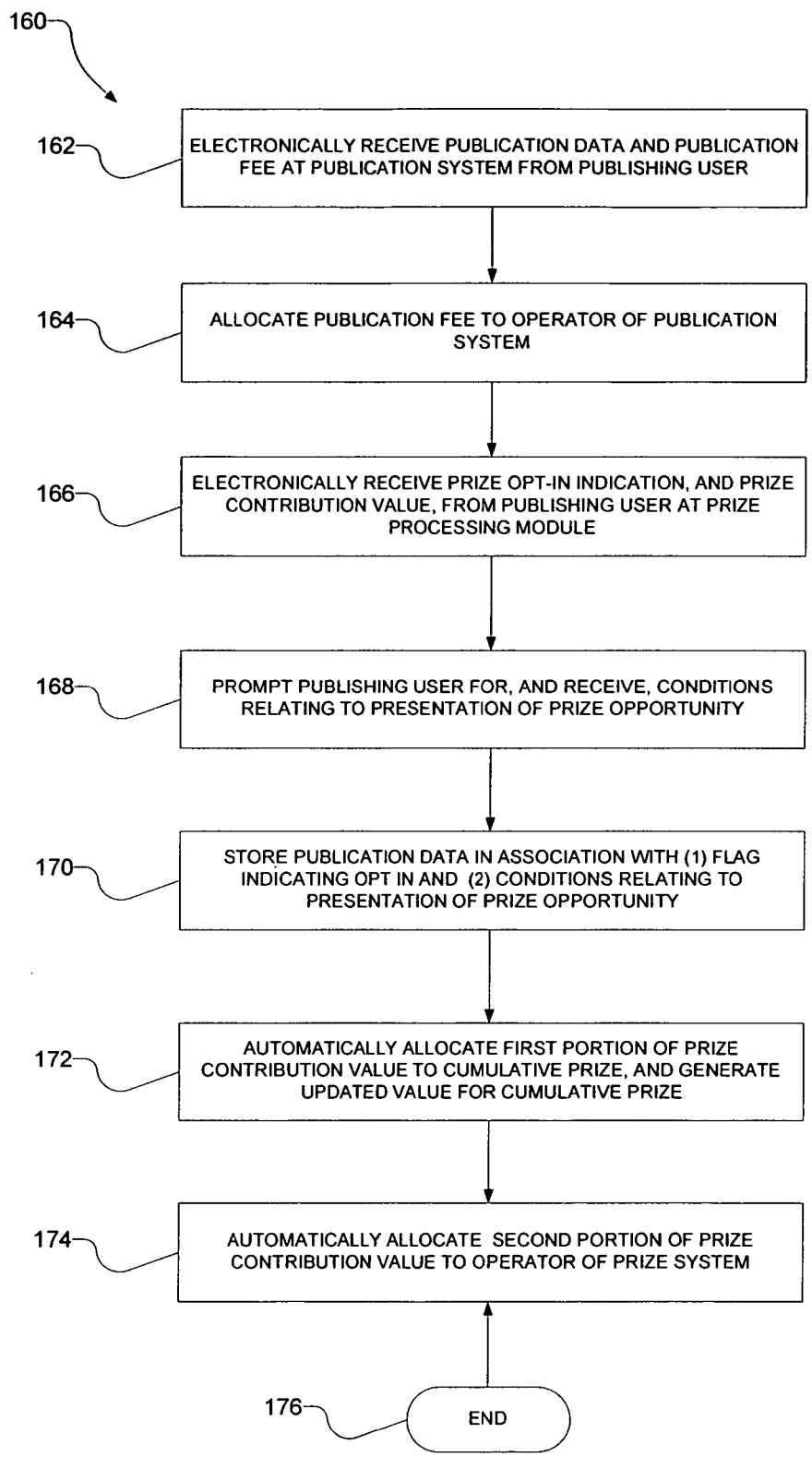
FIG. 5 is a flow chart illustrating a computer-implemented method, according to an example embodiment of the present invention, to receive publication data and an associated publication fee, and a prize opt-in indication and an associated prize contribution fee, and to allocate the received fees.

FIG. 5 is a flow chart illustrating a computer-implemented method 160, according to one example embodiment, to accumulate and allocate prize contribution values received in conjunction with an opt-in indication for a prize scheme to be operated in association with the publication of data. The computer-implemented method 160 will be described below in conjunction with a description of a series 180 of interfaces illustrated in FIG. 6, the series 180 of interfaces providing an example manner in which various data communications may be effected.

The computer-implemented method 160 commences at block 162 with the receipt, at the publication module 18, of publication data and an associated publication fee 22. The publication data and the publication fee 22 are received from a publishing user 12. The publication data and publication fee 22 need not of course be received contemporaneously, but could be received at different steps of an input process to the publication module 18.

At block 164, the publication module 18 proceeds to allocate the publication fee 22 to an operator of the publication module (e.g., a publisher 24). Where the publication module 18 forms part of a commerce system (e.g., the commerce system 42), the publication fee 22 may be a listing fee that the commerce system 42 charges to a publishing user to list data describing goods and/or services on the commerce system 42, such goods and/or services being made available for transaction by the publishing user 12. In other embodiments where the publishing module 18 forms part of, for example, an email system, the publication fee 22 may, for example, be a monthly subscription that is charged to the publishing user 12 for email services.

At block 166, the network-based system 10 receives a prize opt-in indication from the publishing user, as well as a prize contribution value in the exemplary form of the prize opt-in fee 26. In one embodiment, both the opt-in indication and the prize opt-in fee 26 are received by the prize processing module 20. In other embodiments, the prize opt-in indication could, of course, be received by the publication module 18, which would then communicate receipt of this indication to the prize processing module 20. The prize opt-in indication is received with respect to a certain instance of publication data received from the publishing user, thus indicating that the prize opt-in by the publishing user is in connection with the specific instance of publication data. Accordingly, the prize opt-in indication will be interpreted by the network-based system 10 as an instruction to present an opportunity to win the prize 30 to a viewing user 14, in association with the publication (e.g., communication) of the respective instance of publication data.

At block 168, the network-based system 10, and specifically the prize processing module 20, prompts the publishing user 12 for, and receives, conditions relating to the presentation of a prize opportunity in association with the respective instance of publication data. Such conditions may pertain to the manner of interaction by the viewing user 14 with the network-based system 10. For example, where the network-based system 10 comprises a commerce system 42, such conditions may be that the opportunity is only presented to a viewing user 14 that has entered into a transaction process with respect to an item that is the subject of a listing. To this end, the conditions received from the publishing user 12 may stipulate that only the highest (or winning) bidder on an auction-based process is presented with the opportunity. Similarly, the received conditions may stipulate that the opportunity is only presented to a viewing user 14 that has agreed to purchase an item for a fixed price. The conditions pertaining to user behaviour could also require, for example, the user to view a pre-determined number of advertisements presented by the network-based system 10, or perform some other action with respect to the network-based system 10, in order to qualify for the presentation of the prize opportunity.

The conditions may also relate to qualifications of a viewing user 14. Again, in an embodiment in which the network-based system 10 is a commerce system 42, a reputation, transaction history, or other profile characteristic may be utilized to qualify a viewing user 14, in terms of conditions received from the publishing user 12, for the presentation of the prize opportunity. Other conditions that may be received from the publishing user 12 may relate to a time of day (e.g., prize opportunities are only presented at a certain time), or regarding the regularity of presentation of a prize opportunity (e.g., that a prize opportunity is presented to every 10$^{th}$ viewer of certain publication data, or is presented in a random fashion to viewers of the publication data). It will be appreciated that a broad variety of conditions, relating to the presentation of the prize opportunity, may be stipulated by a publishing user 12.

At block 170, the publication module 18 proceeds to store the publication data in association with the received prize opt-in indication, and the conditions relating to the presentation of the prize opportunity. Turning to the exemplary data structures described above with reference to FIG. 4, for example, the publication data may be stored as an item record within the items table 134, the prize opt-in indication may be stored as a record within the prize opt-in table 150, and the received conditions may be stored as records within the conditions table 152. The storage of the various data at block 170 may be performed by the publication module 18, this module 18 having received the required information via the interface 16 and/or from the prize processing module 20.

At block 172, the prize processing module 20 automatically allocates the first portion 28 of the prize opt-in fee 26 to the prize 30, thereby to generate an updated value for the prize 30. At block 174, the prize processing module 20 automatically allocates the second portion 32 of the prize opt-in fee 26 to an operator of the prize processing module 20 (e.g., the sweepstakes operator 33 shown in FIG. 1). The computer-implemented method 160 then terminates at block 176.

Figure 6:
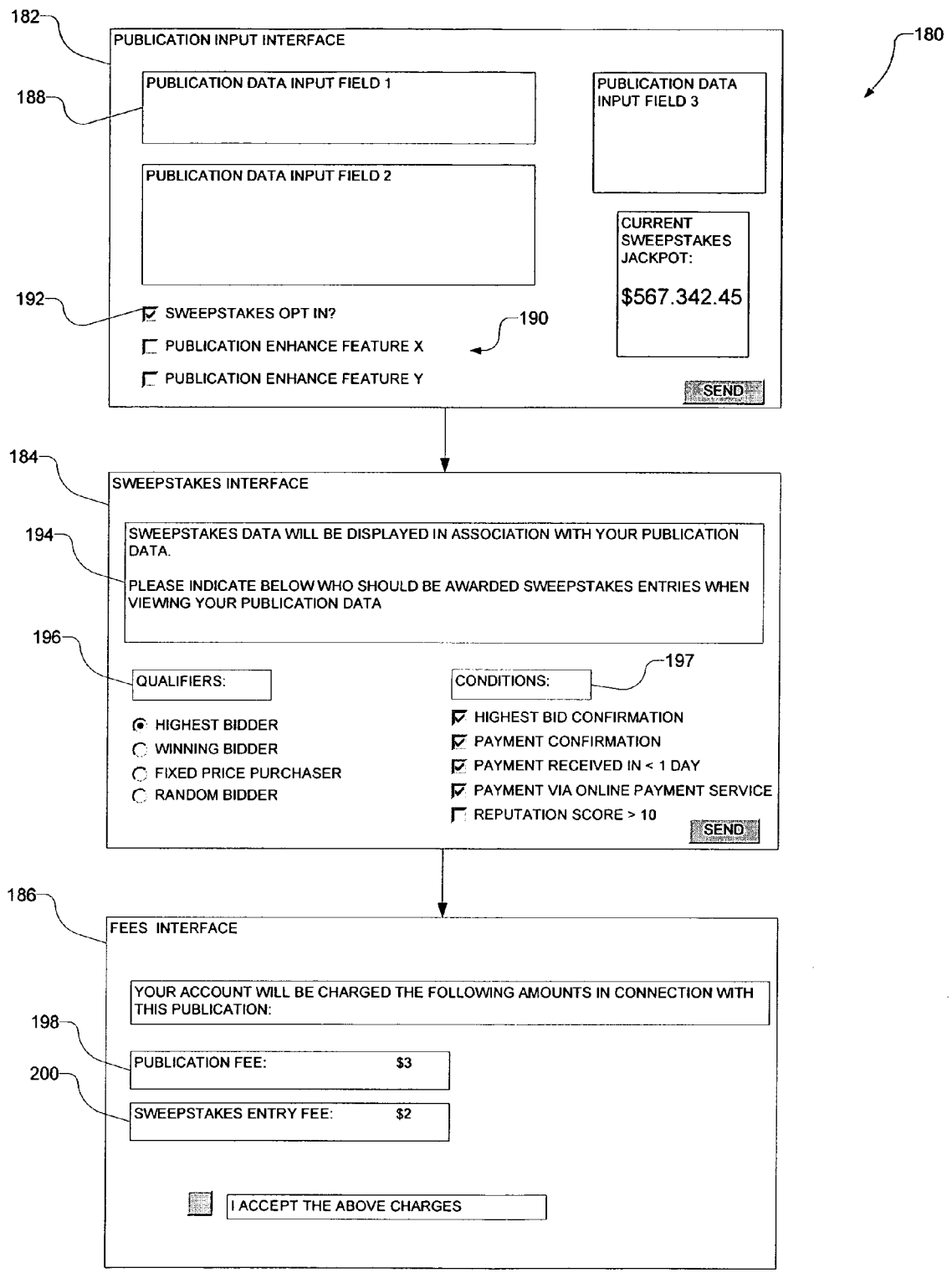
FIG. 6 is a user interface diagram illustrating a series of user interfaces, according to an example embodiment of the present invention, to receive the publication data, a prize opt-in indication, and associated fees.

FIG. 6 shows a series 180 of interfaces that may be generated by the network-based system 10, in one example embodiment, during the performance of various operations at block 162-176, as described above.

The series 180 includes a publication input interface 182, a sweepstakes (prize) interface 184 and a fees interface 186. Turning first to the publication input interface 182, this interface includes a number of publication data input fields 188 into which a publishing user 122 can input publication data to be transmitted to, and received by, the network-based system 10 for publication to one or more viewing users 14. The publication input interface 182 also includes a number of publication enhancement inputs 190, one of which is a prize opt-in option, in the example form of a sweepstakes opt-in option 192. Specifically, the sweepstakes opt-in option 192 has an associated checkbox, which is user selectable by the publishing user 12 to provide the prize opt-in indication to the network-based system 10.

Responsive to user selection of the sweepstakes opt-in option 192, and the communication of this indication to the network-based system 10, the network-based system 10 may generate and communicate to a computer system operated by a publishing user 12 the sweepstakes interface 184. The sweepstakes interface 184 includes a data portion 194 providing information regarding the prize scheme supported by the network-based system 10, and also provides a number of condition inputs whereby the user is prompted for, and can provide, conditions relating to the presentation a prize opportunity. Example condition inputs include qualification inputs 196, utilizing which a publishing user 12 may specify qualifications that must be satisfied by a viewing user 14 in order to be presented with the prize opportunity. Further, the condition inputs may include a conditions input section 196 utilizing which a publishing user 12 can select from a predetermined list of conditions presented within the sweepstakes interface 184.

Having provided the inputs to the sweepstake interface 184, the data input therein may be communicated from a computer system of a publishing user 12 to the network-based system 10, responsive to which the network-based system 10 may generate, and communicate to the publishing user 12, the fees interface 186. The fees interface 186 indicates a publication fee 198 and a sweepstakes entry fee 200 which, upon receipt of confirmation from the publishing user, are charged to an account of the publishing user 12 (e.g., a funded account maintained by the payment servers or a bank account maintained with a bank, or an account maintained by the network-based system 10 itself).

Figure 7:
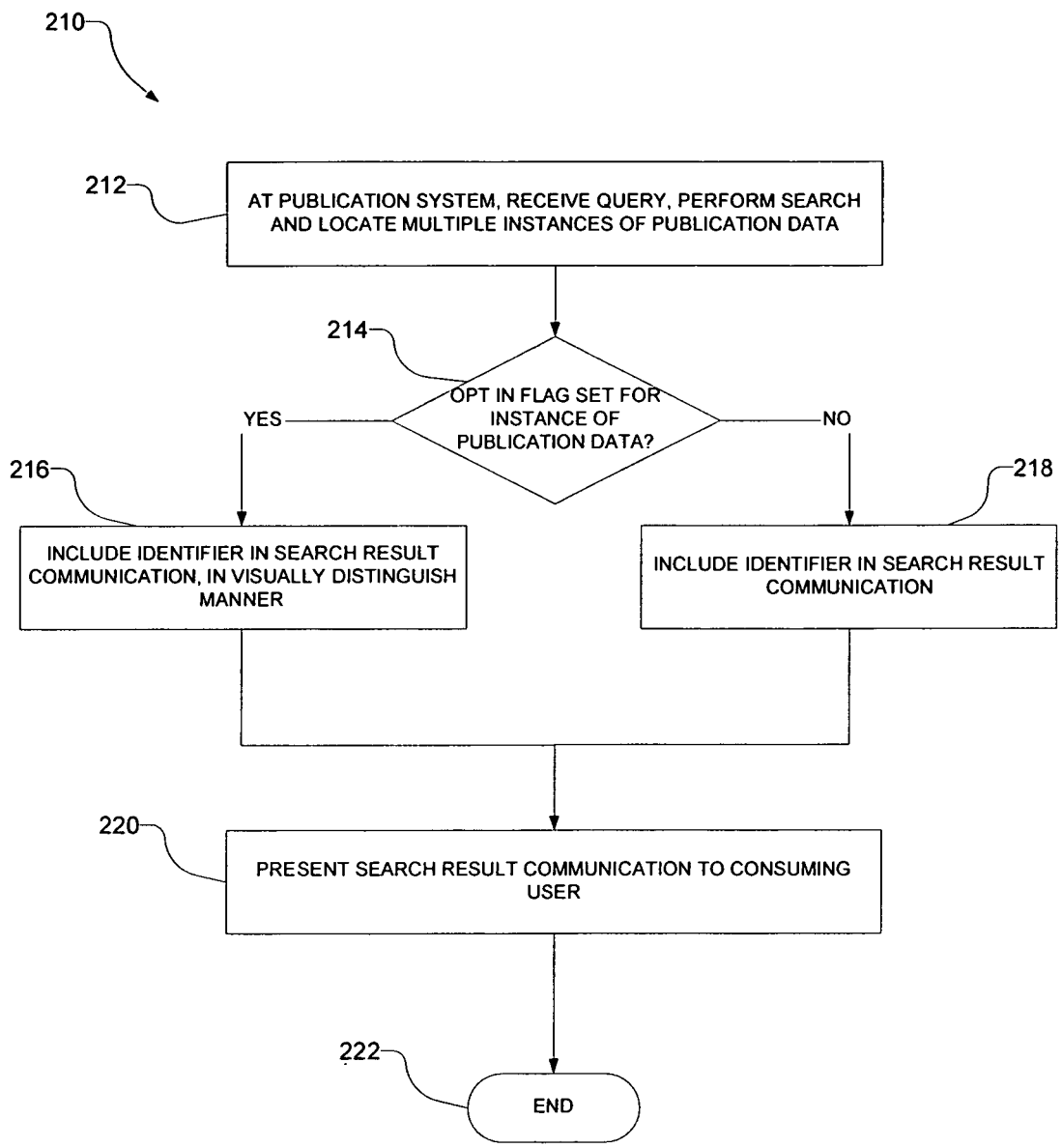
FIG. 7 is a flow chart illustrating a computer-implemented method, according to an example embodiment of the present invention, to present search results, which visually distinguish between publication data for which a prize opt-in indication has been received, and publication data for which no such indication has been received.

FIG. 7 is a flowchart illustrating a computer-implemented method 210, according to an example embodiment of the present invention, to present the results of a search conducted against multiple instances of publication data in such a manner to visually distinguish those instances of publication data for which the publishing user 12 has elected to opt-in to a prize scheme. The computer-implemented method 210 commences at block 212 with the receipt, at the publication module 18 of the network-based system 10, of a search query from a viewing user 14. The query, for example, may be a keyword-based query or may be a browse-based query directed to a category (or other hierarchical) data structure according to which instances of publication data may be organized by the publication module 18. In one embodiment where the publication module 18 is instantiated within the commerce system 42 shown at FIG. 2, the query may specifically be serviced by one or more of the navigation applications 96 described above with reference to FIG. 3.

Also, at block 212, the publication module 18 then proceeds to perform a search of stored publication data (e.g., item records within an items table 134) and locates multiple instances of the publication data that satisfy the query.

At decision block 214, the publication module 18 determines whether, for each of the instances of publication data, whether the publishing user 12 exercised an option to opt-in to the prize scheme. Again, in an example embodiment, an embodiment of the publication module 18 may reference the prize opt-in table 150 to determine whether a particular item record has been associated with a prize-opt-in by the relevant publishing user 12.

In the event that a particular instance of publication data has been opted-in to the prize scheme, at block 216 the publication module 18 visually distinguishes an identifier, for the relevant instance of publication data, in a search result communication.

On the other hand, should it be determined, for a particular instance of the publication data at decision block 214 that the relevant instance has not been opted-in to the prize scheme, at block 218, the publication module 18 includes an identifier for the relevant instance of publication data in the search result communication in a manner that is not visually distinguished. Referring to the operations performed at blocks 216 and 218, it will be appreciated that the computer-implemented method 210 seeks to visually differentiate the identifiers for instances of publication data that have been opted-in to the prize scheme from those that have not. This could of course be done by marking, or otherwise identifying, instances that have not been opted-in, in this manner to visually distinguish identifiers for those instances of publication data that have been opted-in.

Figure 9:
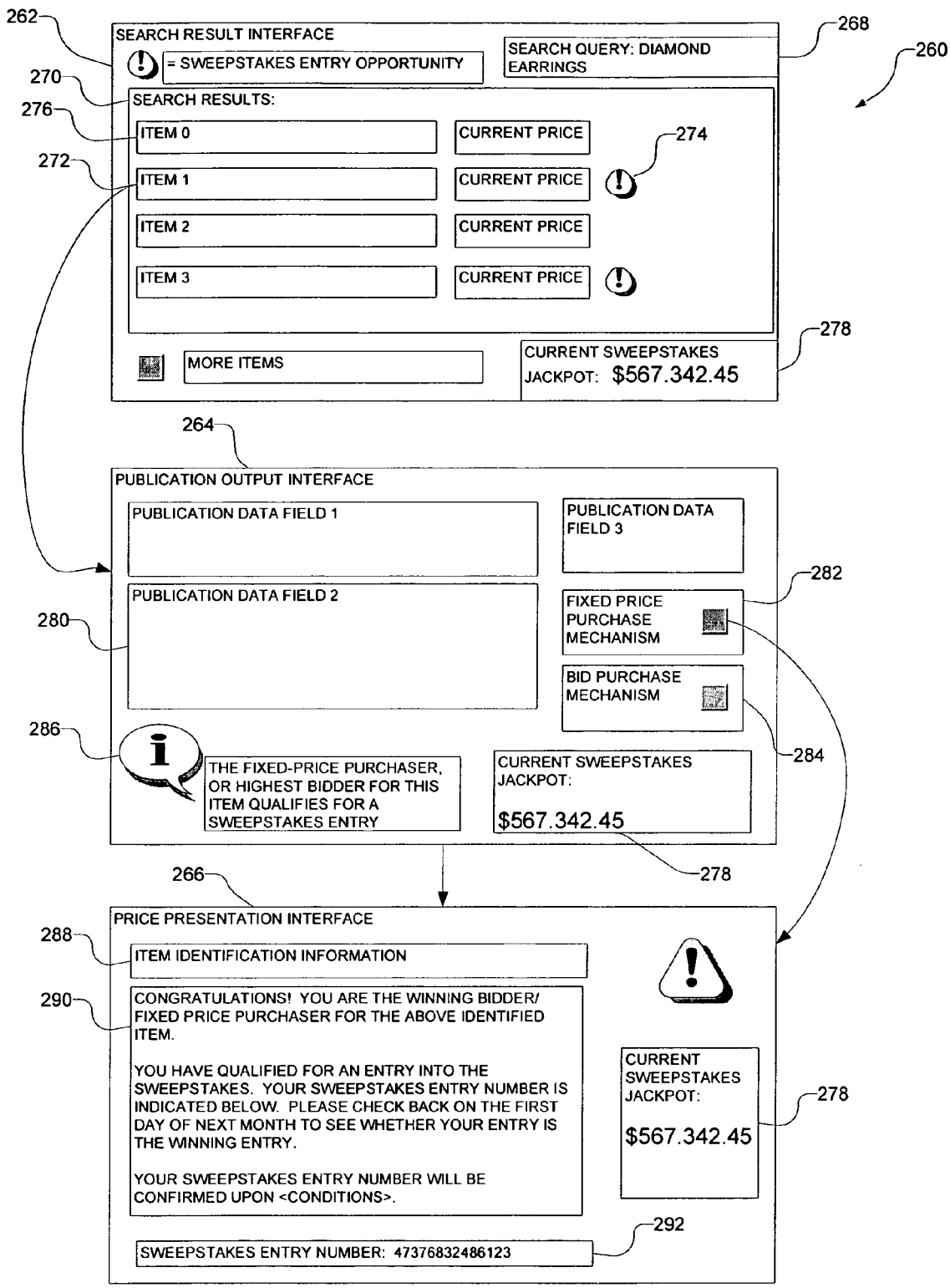
FIG. 9 illustrates a series of user interfaces, according to an example embodiment of the present invention, to present search results, and to publish publication data in conjunction with a prize opportunity.

The computer-implemented method 210 then progresses to block 220, where the publication module 18 presents the search result communication to the viewing user 14 from which the original query originated. Again, the search result communication may be a "push" communication (e.g., an email, IM message, SMS message etc.) or a "pull" communication (e.g., an HTML document, Word document, PDF document etc.) that is sent to the viewing user 14 responsive to a specific request therefore. An example search result communication in the form of an interface 262 is shown in FIG. 9 as part of a series 260 of HTML-based interfaces that may be presented to a user by the publication module 18. As shown in FIG. 9, the search result interface 262 shows details 268 of a search query received at the publication module 18, as well as search results 270. The search results 270 include identifiers for each located instance of publication data. It will be further noted that the identifier 272, for an instance of publication data that has been opted-in to the prize scheme, is visually distinguished by a "sweepstakes" icon 274 from an identifier 276 for an instance of publication data that has not been opted-in to the prize scheme. The display of the "sweepstakes" icon 274 is merely one example of a manner in which an identifier for an instance of publication data may be visually distinguished. It will also be noted from FIG. 9 that the search result interface 262 provides a current prize value, in the form of a current sweepstakes jackpot cumulative prize value indication 278.

Figure 8:
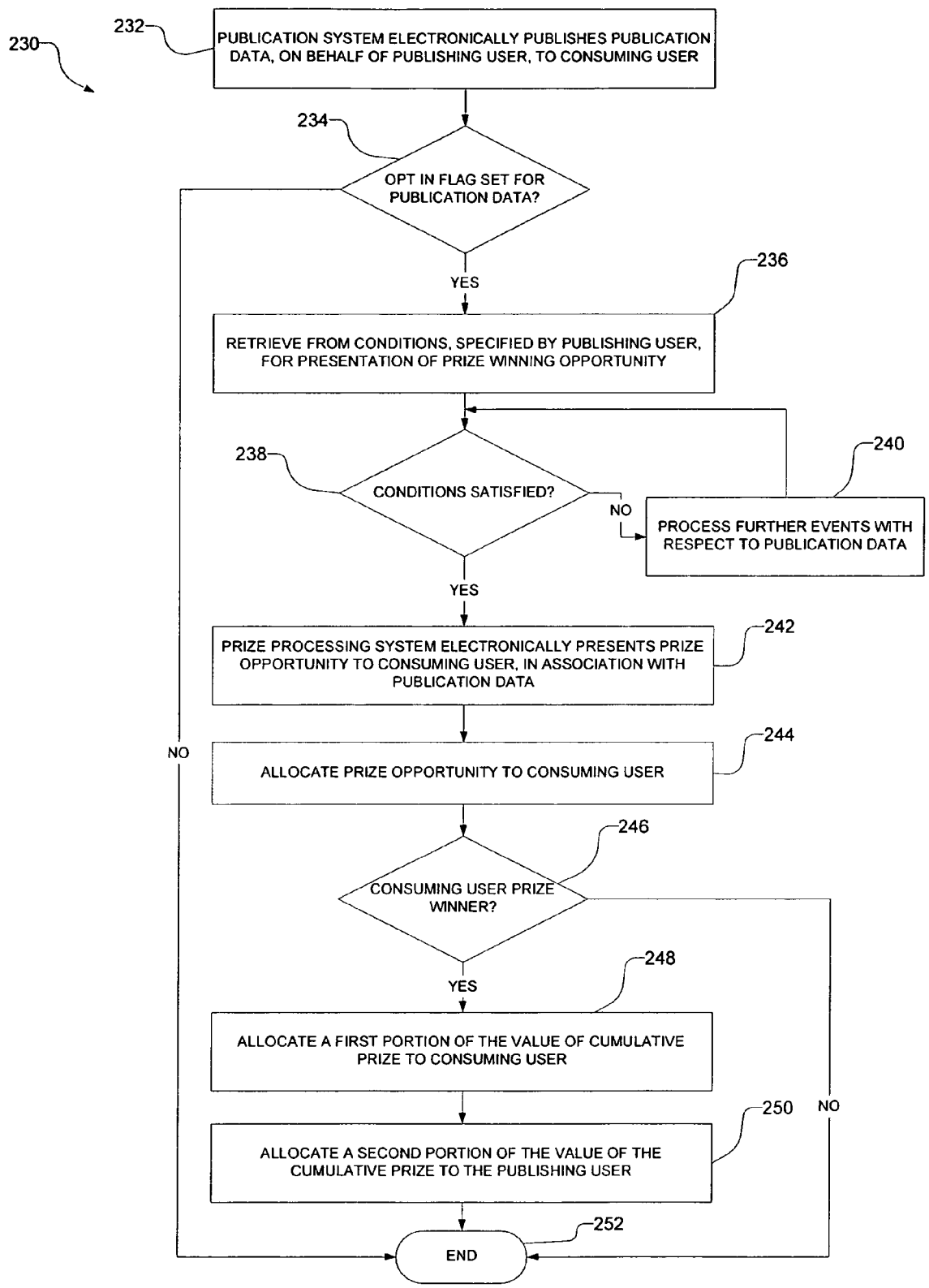
FIG. 8 is a flow chart illustrating a computer-implemented method, according to an example embodiment of the present invention, to electronically publish publication data on behalf of a publishing user, and to present a prize opportunity in conjunction with the publication of such publication data.

FIG. 8 is a flow chart illustrating a computer-implemented method 230, according to an example embodiment of the present invention, to publish data in association with an opportunity to win a prize, to detect a prize-winning event, and to allocate a prize, in an automated manner, in accordance with a programmed structure of a prize scheme. The computer-implemented method 230 commences at block 232 with the publication module 18 electronically publishing publication data, on behalf of a publishing user 12, to one or more viewing users. Referring again to FIG. 9, this publication of the publication data may, for example, be in the form of a publication output interface 264 that is generated and communicated to a viewing user 14, responsive to receiving input, at the publication module 18, from the viewing user 14 identifying a selection of the identifier (e.g., hypertext link) 272.

Dealing more specifically with the publication output interface 264, the interface is shown to include one or more instances 280 of publication data. Further, in an example embodiment in which the publication module 18 is instantiated within the context of a commerce system 42, the interface may also facilitate interaction with one or more price-setting mechanisms. For example, an interface component 282 may facilitate access to a fixed-price purchase mechanism, and interface component 284 may provide access to an auction price purchase mechanism.

Further, where an instance 280 of the publication data has been opted-in to the prize scheme, prize information 286 is also included within the publication output interface 264. In the example shown in FIG. 9, the prize information 286 indicates that a fixed-price purchaser of an item described by the publication data 280, or a highest bidder for such an item, may qualify for an opportunity to win a prize, in the example form of sweepstakes entry. The publication output interface 264 is again shown to include a current prize value information in the form of a current sweepstakes jackpot cumulative value 278.

The interface 264 shown in FIG. 9, it will be appreciated, is generated responsive to the selection of the identifier 272 for publication data that has been opted-in to the prize scheme. On the other hand, should an identifier for publication data that has not been opted-in to the prize scheme be selected (e.g., should identifier 276 be selected), the information 286 and 278 shown to form part of the publication output interface 264 would be omitted by the publication module 18 from this interface 264.

Returning to FIG. 8, at decision block 234, the network-based system 10 determines whether the publication data, published at block 232, has been opted-in to the prize scheme. If not, the computer-implemented method 230 hen proceeds to immediately terminate at block 252, and publication of the publication data may be handled by the publication module 18 independently of any functions provided by the prize processing module 20.

On the other hand, should the relevant publication data be determined at decision block 234 to have been opted-in to the prize scheme, the computer-implemented method 230 proceeds to block 236, where the publication module 18 proceeds to retrieve conditions, specified by a publishing user 12, in connection with the publication data for the associated presentation of a prize-winning opportunity. For example, these conditions may specify that the prize-winning opportunity be presented to a fixed-price purchaser or a highest bidder for an item that is described by the publication data.

Having retrieved information reflecting the conditions for the presentation of the prize winning opportunity, the publication module 18, at decision block 238, performs a continual monitoring to determine whether these conditions have been satisfied. In the absence of the conditions being satisfied, the computer-implemented method 230 may continue to process, at block 240, further events with respect to the publication data. For example, a certain process flow may need to occur prior to the satisfaction of the conditions, or the satisfaction of the conditions may hinge on an event occurring that is somewhat separated in time from the publication of the publication data. The conditions, for example, may specify that a purchaser provide a payment for an item to a seller utilising a pre-determined payment service. The determination that these conditions have been satisfied may occur at a time later than the publication of the publication data that occurs at block 232. Accordingly, the publication module 18 may thus interact, via the interface 16, with other services of computer systems (e.g., an external payment service) to determine whether the stipulated conditions have been satisfied.

If it is determined at decision block 238 that the conditions have been satisfied, the computer-implemented method 230 progresses to block 242 where the prize processing module 20 interacts with the publication module 18 to electronically present the prize opportunity, associated with the publication data, to the viewing user 14. While the presentation of the prize opportunity in association with the publication data may occur through the publication of the publication data and the presentation of the prize opportunity as a continuous flow, this need not necessarily be the case, and the association between the publication data and the presentation of the prize opportunity may be achieve in a number of other ways. For example, the association may be achieved through the identification, in the presentation of the prize opportunity, of the publication data.

The publication module 18 may, at block 242, also present a number of opportunities to win the prize in conjunction with a number of publications of the publication data, respectively. The number of opportunities presented by the publication module 18 may in this case be dependent upon the prize contribution value received from the publishing user. For example, the application module 18 may present prize-winning opportunities to the first 5 viewers of a listing where the relevant publishing user 12 paid a $50 price contribution value, and may present prize-winning opportunities to the first 10 viewers of a further listing where the relevant publishing user 12 paid a $100 price contribution value.

Again referencing FIG. 9, the series 260 of interfaces is shown to include a prize presentation interface 266, which may, in an example embodiment, present the prize opportunity to the viewing user in association with the publication data. The association between the publication data and the opportunity presented in the interface 266 may be achieved, for example, through the inclusion of both the interfaces 264 and 266 in a flow. Further, the interface 266 is shown to include item identification information 288, which forms part of the publication data 280. The interface 266 is also shown to include prize opportunity information 290, advising the viewing user 14 of the details of the prize scheme, and the presentation of the opportunity. For example, where the prize scheme is a sweepstake lottery, the viewing user 14 may be advised that they have been allocated an entry (possibly subject to the satisfaction of further conditions) into the sweepstakes scheme and that a winner of the sweepstakes scheme will be determined at some future time. To this end, the interface 266 is shown to include a sweepstakes entry number 292.

It should also be noted that presentation of the opportunity at block 242 may not result in a final allocation of the opportunity (e.g. a sweepstakes entry) as further conditions may have been stipulated by the publishing user that need to be satisfied prior to the final allocation of the prize opportunity. For example, the information 290 may identify a number of further conditions to be satisfied by the viewing user 14 prior to the final allocation, of the opportunity. For example, the viewing user 14 may be required to utilise a predetermined payment service, or make payment for a purchased item within a predetermined time, in order to finally qualify for the prize opportunity. Accordingly, upon the satisfaction of these conditions, the computer-implemented method 230 may, at block 244, perform a final allocation of the prize opportunity to the viewing user 14, assuming that all conditions for both the presentation and the allocation of the prize-winning opportunity have been satisfied by the viewing user 14. The conditions for the presentation of the prize winning opportunity, and the conditions for the allocation of the prize winning opportunity may be different and each of these conditions may need to be satisfied for a final allocation.

At decision block 246, the prize processing module 20 operates to determine whether the viewing user 14 is a prize winner, in terms of the relevant prize scheme. For example, where the prize scheme is a sweepstakes lottery, a "drawing" of a winning entry may occur at a predetermined time. Alternatively, where the prize scheme is an "instant win" scheme, the viewing user 14 may have instantly exercised the prize winning opportunity, the prize processing module 20 in this case being immediately able to determine whether the viewing user 14 is a prize winner or not. In the event that the viewing user 14 is not determined to be a prize winner, the computer-implemented method 230 proceeds to terminate at block 252.

On the other hand, should the viewing user 14 be identified as a winner of the prize 30, the computer-implemented method 230 progresses to block 248 where the prize processing module 20 may communicate with the publication module 18 to advise the viewing user 14 of his or her good fortune. Further, at block 248, the prize processing module 20 then allocates a first portion 34 of the value of the prize 30 to the viewing user 14, and at block 250 allocates the second portion 36 of the value of the prize 30 to the relevant publishing user 12. The allocations of the first and second portions 34 and 36 may be performed by the prize processing module 20 interfacing with one or more financial institutions, via the interface 16, to effect the transfer of funds between a prize account operated by, for example the sweepstakes operator 33, and accounts held by the relevant publishing and viewing users 12 and 14.

Figure 10:
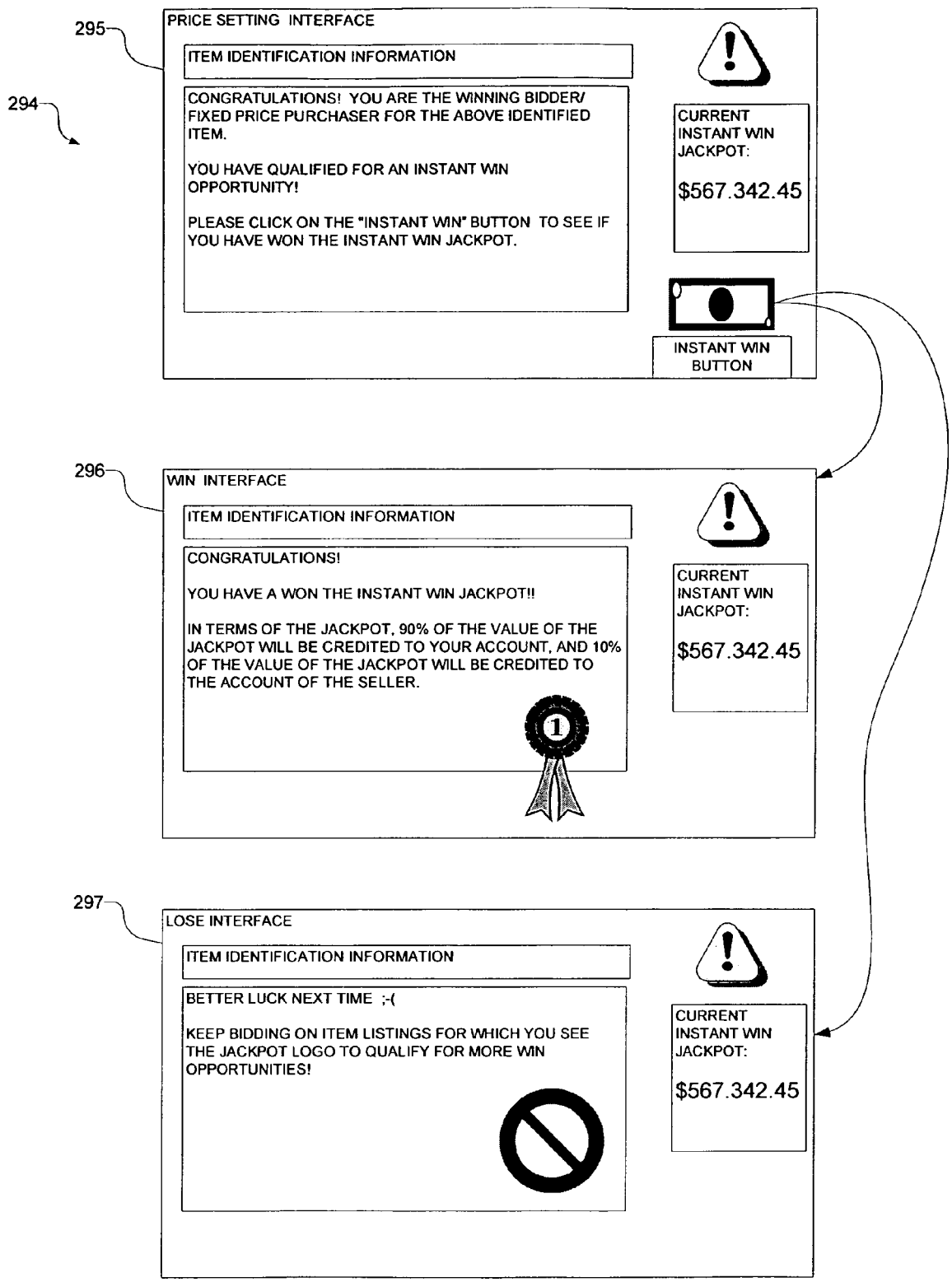
FIG. 10 shows a series of user interfaces, according to an example embodiment of the present invention, to communicate a prize win event, and also to communicate a distribution of a prize to a viewing user.

FIG. 10 illustrates a series of interfaces 294 that may be generated by, and communicated from, the publication module 18 to a viewing user 14, in one example embodiment of the computer-implemented method 230 discussed above with reference to FIG. 8, where the prize scheme is an "instant win" scheme. Specifically, a prize presentation interface 295 serves to advise the viewing user 14 of qualification for the "instant win" prize opportunity, and that he/she may exercise the opportunity by selecting an "instant win" button that is presented within the interface. In the event that the viewing user 14 is determined by the prize processing module 20 to be a prize winner (e.g., at block 246 of the computer-implemented method 230), a publication module 18, in conjunction with the prize processing module 20, presents a win interface 296 to the viewing user 14. The winning interface 296 is shown to congratulate the viewing user 14 on their win, and also to provide them with information regarding the allocation of the prize 30, as described above.

On the other hand, should the viewing user 14 not be determined to be a winner following user selection of the "instant win" button, a lose interface 297 is then communicated to the viewing user 14. In one embodiment, even though the viewing user 14 may not have won the prize 30, the prize processing module 20 may award a consolation prize to the user 14. In this event, the lose interface 297 may include a notification to the viewing user 14 of an award of the consolation prize (e.g., a T-shirt or the like).

From the above, it will be appreciated that the embodiments of the invention address various technical problems that are presented by the concurrent operation of a publication system (e.g., the commerce system 42) and on a prize processing system (e.g., prize system 64). Specifically, through the use of messaging, and the utilisation of a common database, in certain example embodiments, the computational demands on computer systems supporting publication and prize processing are reduced. Further, through the integration of the publication and the prize processing operations, the number of communications to both publishing users 12 and viewing users 14 may be reduced, this serving to reduce network traffic, and enhance network congestion.

Figure 11:
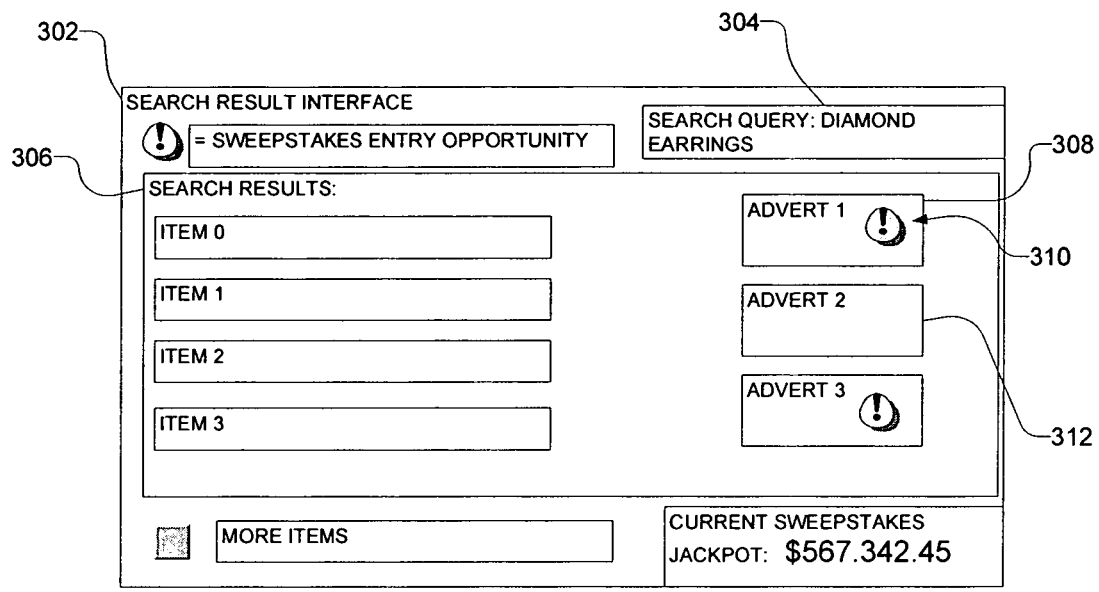
FIG. 11 illustrates a user interface, according to a further example embodiment of the present invention, to present search results.

FIG. 11 shows an HTML-based search result interface 302 that may be presented to a user by the publication module 18, in a further example embodiment of the present invention in which the publication module 18 is operated as part of a search engine that publishes search results in conjunction with paid-placement advertisements. As shown in FIG. 9, the search result interface 302 shows a search query 304 received at the publication module 18, as well as search results 306. The search results 306 include identifiers (e.g., hypertext links) for each located instance of data located based on the search query 304.

The search results 306 are shown in conjunction with a collection of paid-placement advertisements 308, for which an operator of the publication module 18 received publication and placement payments. For example, the advertiser for "advert 1" would have paid more than the advertiser for "advert 3" in order to have "advert 1" appear more highly placed than "advert 3" within the search result interface 302.

In order to further enhance the likelihood that a viewing user 14 will elect to "click-through" an advertisement, an advertiser may, with respect to a particular advertisement, opt in to a prize scheme in terms of which a prize opportunity is presented to a viewing user 14 that clicks through the advertisement, or that takes a predetermined action at a click-through destination (e.g., that purchases a product at the click-through destination). In one embodiment, where the click-through destination is a multi-seller marketplace (e.g., eBay.com), the advertisement 308 may relate to a particular product/service listing that is published via a marketplace platform. In this case, the required user action at the click-through destination may be with respect to that particular product/service listing. In another embodiment, where the click-through destination is a single-seller commerce location (e.g., Amazon.com), the required user action at the click-through destination may be with respect to the location itself (e.g., performance of a specific action or activity within the Amazon.com domain), as opposed to an activity with respect to a particular product or service offering.

Returning to FIG. 11, an advertisement 308 that has been opted-in to the prize scheme is visually distinguished by a sweepstakes icon 310 from an advertisement 312 that has not been opted-in to the prize scheme. The display of the "sweepstakes" icon 310 is merely one example of a manner in which an advertisement may be visually distinguished. It will also be noted from FIG. 11 that the search result interface 302 provides a current prize value, in the form of a current sweepstakes jackpot cumulative prize value indication.

Figure 12:
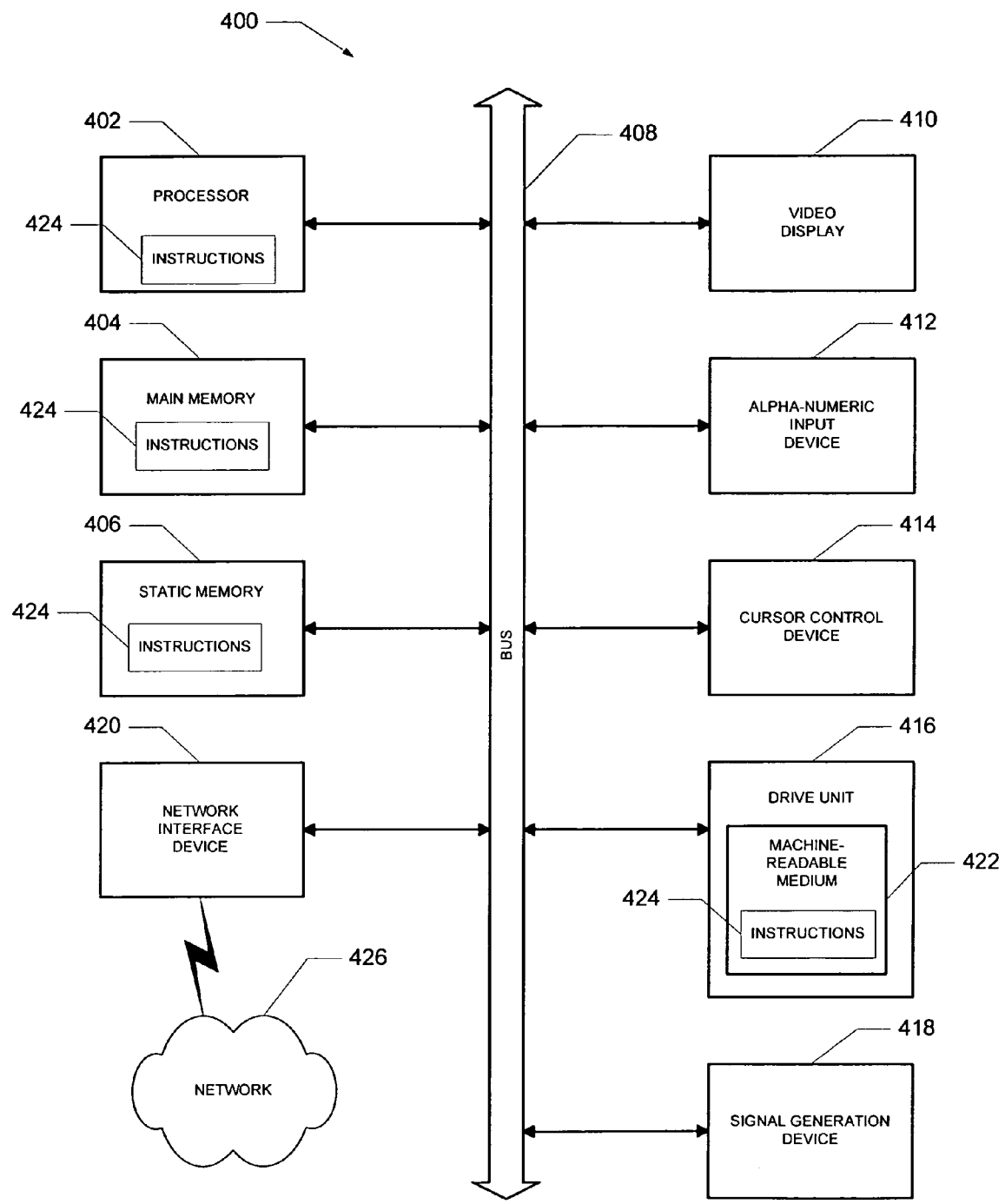
FIG. 12 shows a diagrammatic representation of a machine in the example form of a computer system within which a set of instructions, for causing the machine to perform any one or more of the computer-implemented methodologies discussed herein, may be executed.

FIG. 12 shows a diagrammatic representation of machine in the example form of a computer system 400 within which a set of instructions, for causing the machine to perform any one or more of the computer-implemented methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the computer-implemented methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the computer-implemented methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the computer-implemented methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   an interface to receive:
   publication data at a computer system from a publishing user;

an indication from the publishing user that the publication data is opted into a prize scheme;

a publication value, from the publishing user, to publish the publication data; and a prize contribution value, from the publishing user, the prize contribution value being an opt-in fee for the prize scheme that causes display of an opportunity to win a prize in conjunction with the publication of the publication data, the prize contribution value being distinct from the publication value to publish the publication data; and a condition that is to be satisfied by a viewing user as a prerequisite to causing display of the opportunity to win the prize; and a publication module comprising at least one processor to:
  receive a search query from the viewing user;
  verify that the viewing user satisfies the received condition;
  determine a plurality of instances of publication data that match the search query including the publication data from the publishing user; and
  electronically publish a list of the plurality of instances of the publication data that match the search query including the publication data of the publishing user to an interface of a viewing user, the list visually distinguishing a first set of the plurality of instances of the publication data that are opted into the prize scheme from a second set of the plurality of instances of the publication data not opted into the prize scheme, the publication data containing data that is distinct from the indication of the opportunity to win the prize.

2. The system of claim 1, wherein the prize is a cumulative prize and the system includes a prize processing module to calculate a value of the cumulative prize based on a cumulative contribution of prize contribution values received from a plurality of publishing users.

3. The system of claim 2, wherein the interface is to receive further publication data at the computer system from the plurality of publishing users, and is to receive, from the plurality of publishing users, the prize contribution values on which the value of the cumulative prize is based.

4. The system of claim 2, wherein the prize processing module is to allocate a first portion of the prize contribution value received from the publishing user to the value of the cumulative prize, and to allocate a second portion of the prize contribution value received from the publishing user to a prize scheme operator.

5. The system of claim 2, wherein the prize processing module is automatically to determine that a viewing user has won the cumulative prize, and is to allocate at least a first portion of the value of cumulative prize to the viewing user.

6. The system of claim 5, wherein the prize processing module is automatically to allocate at least a second portion of the value of the cumulative prize to the publishing user.

7. The system of claim 2, wherein the prize processing module, responsive to the receipt of the prize contribution value from the publishing user, is automatically to allocate at least a first portion of the prize contribution value to the value of the cumulative prize, thereby generating an updated value of the cumulative prize, the publication module automatically to present the updated value of the cumulative prize in real-time.

8. The system of claim 1, wherein the publication module is to electronically present a number of opportunities to win the prize in conjunction with the publication of the publication data, the number of opportunities presented by the publication module being dependent upon the prize contribution value.

9. The system of claim 1, wherein the search query comprises a search for publication data describing a good or service sought to be purchased by the viewing user.

10. The system of claim 1, wherein the interface is to receive, from the publishing user, the publication value in exchange for the publication of the publication data by the computer system.

11. The system of claim 1, wherein the computer system comprises a network-based publication system.

12. The system of claim 1, wherein:
the condition that is to be satisfied is a time period, and
  the viewing user receives the indication of the opportunity to win the prize during the time period.

13. The system of claim 1, wherein the condition that is to be satisfied by the viewing user pertains to a manner in which the viewing user transacts to purchase an item related to the publication data.

14. The system of claim 1, wherein the condition that is to be satisfied by the viewing user pertains to a qualification of the viewing user.

15. The system of claim 1, wherein the publication module is to present the indication of the opportunity to win the prize to the viewing user responsive to the viewing user complying with the condition.

16. The system of claim 1, wherein the opportunity to win the price compromises an entry into a lottery scheme.

17. The system of claim 1, wherein the opportunity to win the prize comprises an instant win opportunity, in terms of which the viewing user instantly determines whether the prize has been won.

18. The system of claim 1, wherein the publication module is to present the value of the prize to a viewing user.

19. The system of claim 1, wherein the publication module is to display the value of the prize in association with the publication data, responsive to the receipt of the prize contribution value from the publishing user.

20. The system of claim 1, wherein the publication module is further to:
  receiving a selection of the publication data of the publishing user from the list;
  determining whether a condition under which the publication module is to present the indication of the opportunity to win the prize indicated by the publishing user is satisfied by the viewing user that selected the publication data of the publishing user; and
  in response to the condition indicated by the publishing user being satisfied, publishing the opportunity to win the prize to the viewing user in conjunction with the publication data of the publishing user, the publication data containing data that is distinct from the indication of the opportunity to win the prize.

21. The system of claim 1, wherein the search query comprises a keyword search and the publication module is to
  determine the plurality of instances of publication data that match the keyword search.

22. A computer-implemented method comprising:
  receiving publication data at a computer system from a publishing user;
  receiving, from the publishing user, a publication value to publish the publication data, a prize contribution value, and an indication that the publication data is opted into a prize scheme, the prize contribution value being an opt-in fee for the prize scheme that causes presentation to an interface of a viewing user of an indication of an opportunity to win a prize, the indication of the opportunity to win the prize to be presented to the viewing user in conjunction with the publication of the publication data, the prize contribution value being distinct from the publication value to publish the publication data;

receiving, from the publishing user, a condition that is to be satisfied by the viewing user as a prerequisite to causing display of the opportunity to win the prize;

receiving a search query from the viewing user;

verifying that the viewing user satisfies the received condition;

determining, by a processor, a plurality of instances of publication data that match the search query including the publication data from the publishing user; and electronically publishing a list of the plurality of instances of the publication data including the publication data of the publishing user to the viewing user that match the search query, the list visually distinguishing a first set of the plurality of instances of the publication data that are opted into the prize scheme from a second set of the plurality of instances of the publication data not opted into the prize scheme, the publication data containing data that is distinct from the indication of the opportunity to win the prize.

23. The computer-implemented method of claim 22, wherein the prize is a cumulative prize and, wherein a value of the cumulative prize is based on a cumulative contribution of prize contribution values received from a plurality of publishing users.

24. The computer-implemented method of claim 23, including receiving further publication data at the computer system from the plurality of publishing users, and receiving, from the plurality of publishing users, the prize contribution values on which the value of the cumulative prize is based.

25. The computer-implemented method of claim 23, including, at the computer system, allocating a first portion of the prize contribution value received from the publishing user to the value of the cumulative prize, and allocating a second portion of the prize contribution value received from the publishing user to a prize scheme operator.

26. The computer-implemented method of claim 23, including, responsive to the receipt of the prize contribution value from the publishing user, allocating at least a first portion of the prize contribution value to the value of the cumulative prize, thereby generating an updated value of the cumulative prize, the computer-implemented method further including presenting the updated value of the cumulative prize in real-time.

27. The computer-implemented method of claimed 22, including presenting a number of opportunities to win the prize in conjunction with a number of publications of the publication data, respectively, the number of opportunities presented being dependent upon the prize contribution value.

28. The computer-implemented method of claim 22, wherein the publication data comprises a listing for a good or service sought to be transacted by the publishing user.

29. The computer-implemented method of claim 22, including receiving, from the publishing user, the publication value in exchange for the publication of the publication data by the computer system.

30. The computer-implemented method of claim 22, wherein the computer system comprises a network-based publication system.

31. The computer-implemented method of claim 22, wherein:
the condition that is to be satisfied is a time period, and the viewing user receives the indication of the opportunity to win the prize during the time period.

32. The computer-implemented method of claim 22, wherein the condition that is to be satisfied by the viewing user pertains to a manner in which the viewing user transacts to purchase an item related to the publication data.

33. The computer-implemented method of claim 22, wherein the condition that is to be satisfied by the viewing user pertains to a qualification of the viewing user.

34. The computer-implemented method of claim 22, wherein the indication of the opportunity to win the prize is presented to the viewing user responsive to the viewing user complying with a condition related to the publication data.

35. The computer-implemented method of claim 22, wherein the opportunity to win the prize comprises an entry into a sweepstakes scheme.

36. The computer-implemented method of claim 22, wherein the opportunity to win the prize comprises an instant win opportunity, in terms of which the viewing user instantly determines whether the prize has been won.

37. The computer-implemented method of claim 22, including determining that the viewing user has won the prize, and allocating at least a first portion of the value of the prize to the viewing user.

38. The computer-implemented method of claim 22, including allocating at least a second portion of the value of the prize to the publishing user.

39. The computer-implemented method of claim 22, including presenting, via the computer system, the value of the prize to the viewing user.

40. The computer-implemented method of claim 22, wherein the value of the prize is displayed in association with the publication data, responsive to the receipt of the prize contribution value from the publishing user.

41. A machine-readable storage medium having no transitory signals and embodying a set of instructions that, when executed by a processor of a machine, causes the machine to perform operations comprising:

receiving publication data at a computer system from a publishing user;

receiving, from the publishing user, a publication value to publish the publication data, a prize contribution value, and an indication that the publication data is opted into a prize scheme, the prize contribution value being an opt-in fee for the prize scheme that causes display of an opportunity to win a prize, the indication of the opportunity to win the prize in conjunction with the publication of the publication data, the prize contribution value being distinct from the publication value to publish the publication data;

receive a condition that is to be satisfied by a viewing user as a prerequisite to causing display of the opportunity to win the prize;

receiving a search query from the viewing user;

determine that the viewing user satisfies the received condition;

determining a plurality of instances of publication data that match the search query including the publication data from the publishing user; and electronically publishing a list of the plurality of instances of the publication data including the publication data of the publishing user to the viewing user that match the search query, the list visually distinguishing a first set of the plurality of instances of the publication data that are opted into the prize scheme from a second set of the plurality of instances of the publication data not opted into the prize scheme, the publication data containing data that is distinct from the indication of the opportunity to win a prize.

42. A system including:

first means for receiving:

publication data from a publishing user;

an indication from the publishing user that the publication data is opted into a prize scheme; a publication value, at a computer system from the publishing user to publish the publication data; and a prize contribution value, at the computer system from the publishing user; the prize contribution value being an opt-in fee for the prize scheme that causes a presentation of an indication of an opportunity to win a cumulative prize-to be presented by the computer system in conjunction with the publication of the publication data on an interface of a viewing user, the prize contribution value being distinct from a publication value to publish the publication data; and a condition that is to be satisfied by a viewing user as a prerequisite to causing display of the opportunity to win the prize; and second means for:

verifying that the viewing user satisfies the received condition;

receiving a search query from the viewing user;

determining a plurality of instances of publication data that match the search query including the publication data from the publishing user; and electronically publishing a list of the plurality of instances of the publication data that match the search query including the publication data of the publishing user, the list visually distinguishing a first set of the plurality of instances of the publication data that are opted into the prize scheme from a second set of the plurality of instances of the publication data not opted into the prize scheme, the publication data containing data that is distinct from the opportunity to win.

\* \* \* \* \*

UNITED STATES PATENT AND TRADEMARK OFFICE
CERTIFICATE OF CORRECTION

| | | |
|---|---|---|
| PATENT NO. | : 9,224,148 B2 | Page 1 of 1 |
| APPLICATION NO. | : 11/214507 | |
| DATED | : December 29, 2015 | |
| INVENTOR(S) | : Jay Monahan | |

It is certified that error appears in the above-identified patent and that said Letters Patent is hereby corrected as shown below:

In the Claims

In column 20, line 29, in Claim 16, delete "price compromises" and insert --prize comprises--, therefor In column 23, line 12, in Claim 42, delete "user;" and insert --user,--, therefor Signed and Sealed this
Seventh Day of June, 2016

Michelle K. Lee
*Director of the United States Patent and Trademark Office*